(12) United States Patent
Suzuki

(10) Patent No.: US 6,283,745 B1
(45) Date of Patent: Sep. 4, 2001

(54) INJECTION MOLD FOR PRODUCING SPOOL

(75) Inventor: Takashi Suzuki, Minami-Ashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/262,072

(22) Filed: Mar. 4, 1999

(30) Foreign Application Priority Data

Mar. 9, 1998 (JP) .................................................. 10-056473

(51) Int. Cl.[7] .................................................. B29C 45/17
(52) U.S. Cl. .......................... 425/441; 249/80; 249/135; 249/160; 425/577
(58) Field of Search .................................... 425/577, 441, 425/DIG. 58; 249/135, 160, 80, 111

(56) References Cited

U.S. PATENT DOCUMENTS

| | | | |
|---|---|---|---|
| 3,612,158 | * 10/1971 | Rossi | 164/283 |
| 4,225,109 | * 9/1980 | Yotsutsuji et al. | 249/111 |
| 4,659,032 | * 4/1987 | Rottleb | 242/118.4 |
| 5,038,455 | * 8/1991 | Guest | 29/453 |
| 5,265,821 | * 11/1993 | Takatori | 242/71.1 |
| 5,755,396 | * 5/1998 | Tashiro | 242/584.1 |
| 5,980,811 | * 11/1999 | Towns | 264/328.1 |

OTHER PUBLICATIONS

Editor in Chief, Frederick C. Mish, Merriam–Webster's Dictionary, Tenth Edition, Springfield, Mass, p. 536.*

* cited by examiner

Primary Examiner—Nam Nguyen
Assistant Examiner—Emmanuel S. Luk
(74) Attorney, Agent, or Firm—Sughrue, Mion, Zinn, Macpeak & Seas, PLLC

(57) ABSTRACT

An injection mold for molding a spool with flanges at both ends of a shaft such that the inner wall surfaces of the flanges are not flawed, and the dimension between the flange inner wall surfaces is uniform and thus the flange inner wall surfaces are free from distortion, and further the cooling time is short and hence the molding cycle can be shortened. Two mold members for molding the outer periphery of the shaft of the spool and the inner wall surfaces of the flanges are formed of a material having relatively low thermal conductivity. A pair of mold members for molding the outer wall surfaces of the flanges are formed of a material having relatively high thermal conductivity at least at portions thereof that mold the outer wall surfaces of the flanges.

7 Claims, 6 Drawing Sheets

INJECTION MOLD FOR PRODUCING SPOOL

BACKGROUND OF THE INVENTION

The present invention relates to an injection mold for producing a spool. More particularly, the present invention relates to an injection mold for producing a spool used in a photographic film cartridge or cassette for containing photographic film.

As roll-film for photography, 120 and 220 format roll-films are publicly known, in which photographic film with opaque paper is wound on the shaft portion of a spool having flanges at both ends thereof. 120 format roll-film for photography is photographic film having opaque paper fixed to the base side thereof as backing paper. The photographic film, together with the backing paper, is wound on the shaft portion of a spool. In 220 format roll-film for photography, opaque paper as backing paper is omitted, but instead, opaque paper known as "leader paper" is fixed to the leading end of photographic film, and opaque paper known as "trailer" is fixed to the trailing end of the photographic film, thereby allowing the length of the photographic film to be longer and making the number of exposures larger than in the case of 120 format roll-film. In either of the 120 and 220 format roll-films, the width of the opaque paper is set equal to or slightly longer than the distance between the flanges of the spool in order to ensure light-tightness between each side edge of the opaque paper and the inner wall of the associated flange.

FIG. 4 shows the external appearance of 120 format roll-film 1 for photography. As shown in FIG. 5, 120 format photographic film 2 used in the roll-film 1 has opaque paper 3 fixed to the base side thereof as backing paper by using adhesive tape 4. The leading end portion 3a and trailing end portion 3b of the opaque paper 3 each have an end with a narrowed width.

FIG. 6 is a perspective view of a spool 5. FIG. 7 is a sectional view of the spool 5. As shown in these figures, the spool 5 has a shaft portion 6. The shaft portion 6 has a pair of flanges 7 at both ends thereof to regulate two side edges of the opaque paper 3. In addition, the shaft portion 6 has an axially elongate slit 8 in a central portion thereof.

To wind the roll-film 1 on the spool 5, the trailing end portion 3b of the opaque paper 3 is inserted into the slit 8 of the shaft portion 6, and the photographic film 2, which is backed with the opaque paper 3, is wound around the shaft portion 6 with the emulsion side inside. The leading end portion 3a of the opaque paper 3 is folded with a predetermined width and fixed by using adhesive tape 9. It should be noted that each flange 7 has a chucking groove 10 in the center thereof. The chucking groove 10 is engageable with a key shaft of a camera.

There must not be a gap between each side edge of the opaque paper 3 and the inner wall surface 7a of the associated flange 7. Therefore, the width $D_1$ of the opaque paper 3 is set equal to or slightly wider than the distance (spool inside dimension) $D_2$ between the inner wall surfaces 7a. When the width $D_1$ is wider than the spool inside dimension $D_2$, or when there are variations in the width $D_1$, the opaque paper 3 cannot be wound fast to the shaft portion 6. As a result, the roll diameter of the roll-film 1 wound on the shaft portion 6 increases undesirably. To prevent this problem, the inner wall surface 7a of each flange 7 is provided with an annular groove 11 (see FIG. 8) with a depth h. The groove 11 is concentric with respect to the shaft portion 6. The groove 11 has a flat trapezoid-shaped or arcuate cross-sectional configuration. Therefore, it is possible to prevent the occurrence of such a problem that the side edges of the opaque paper 3, which are brought into contact with the respective inner wall surfaces 7a of the flanges 7, are undesirably folded and tucked in. Thus, the opaque paper 3 is prevented from causing an undesired increase in the roll diameter. In addition, the side edges of the trailing end portion 3b of the wound opaque paper 3 are completely brought into close contact with the respective inner wall surfaces 7a of the flanges 7. Therefore, the required light-tightness is maintained satisfactorily.

Spools for photographic film such as the above-described spool 5 are usually produced by injection molding process. FIG. 9 is a sectional view of a conventional mold assembled for the injection molding process. A product part (mold cavity) 20 is formed essentially by four mold members 12 to 14. That is, the mold has a stationary mold member 12 for molding the lower half of the outer periphery of the shaft portion 6 of the spool 5 and the lower half of the inner wall surface 7a of each flange 7, and a movable mold member 13 for molding the upper half of the outer periphery of the shaft portion 6 and the upper half of the inner wall surface 7a of each flange 7. The mold further has a pair of slide mold members 14 for molding the outer wall surfaces of the flanges 7.

FIG. 10 is an enlarged view showing a part of the product part 20 in the mold shown in FIG. 9 that corresponds to one flange 7. A movable pin 15 is rigidly provided in the center of each of the slide mold members 14 to form a chucking groove 10 at each end of the shaft portion 6 of the spool 5. In addition, each slide mold member 14 is provided with a cooling water channel 16 for the purpose of shortening the cooling time needed to cool the slide mold member 14.

The conventional injection mold for producing a spool for photographic film is made of a material having high mechanical strength and low thermal conductivity, e.g. a stainless mold steel, exclusive of the movable pins 15. The movable pins 15 are formed by using a material having high thermal conductivity, e.g. a beryllium-copper alloy, with a view to accelerating cooling to thereby facilitate removal.

If the inner wall surface 7a of each flange 7 of the spool 5 to be injection-molded has a groove 11 that is concentric with respect to the shaft portion 6 as shown in FIG. 8, that is, if an undercut 19 is present inside a portion of the product part 20 that corresponds to each flange 7, when the molded spool 5 is removed from the mold, both end surfaces of each of the stationary and movable mold members 12 and 13 must be forcedly removed from the inner wall surfaces 7a of the flanges 7. This may flaw the inner wall surfaces 7a of the flanges 7 of the molded spool 5, causing the light-tightness to be degraded. Furthermore, regarding the shape of the molded spool 5, the flanges 7 tend to bow inward. Therefore, the dimension between the flange inner wall surfaces varies according to the position in the circumferential direction, and thus the flange inner wall surfaces suffer distortion. Furthermore, in order to obtain the dimensional stability of the flanges 7, sufficiently long cooling time is needed. Therefore, it has heretofore been difficult to shorten the molding cycle.

SUMMARY OF THE INVENTION

In view of the above-described problems of the prior art, an object of the present invention is to provide an injection mold for producing a spool, which is designed so that the inner wall surfaces of flanges at both ends of the spool are not flawed, and the dimension between the flange inner wall surfaces is uniform and thus the flange inner wall surfaces are free from distortion, and further the cooling time is short and hence the molding cycle can be shortened.

To attain the above-described object, the present invention provides an injection mold for molding a spool having flanges at both ends of a shaft. The injection mold includes two mold members for molding the outer periphery of the shaft of the spool and the inner wall surfaces of the flanges. The injection mold further includes a pair of mold members for molding the outer wall surfaces of the flanges. The two mold members for molding the outer periphery of the shaft of the spool and the inner wall surfaces of the flanges are formed of a material having relatively low thermal conductivity. The pair of mold members for molding the outer wall surfaces of the flanges are formed of a material having relatively high thermal conductivity at least at portions thereof that mold the outer wall surfaces of the flanges.

In this case, it is desirable that the thermal conductivity of the material having relatively high thermal conductivity should be in the range of from two to four times as high as the thermal conductivity of the material having relatively low thermal conductivity.

As specific examples of the materials, the material having relatively high thermal conductivity consists essentially of a beryllium-copper alloy, and the material having relatively low thermal conductivity consists essentially of a stainless mold steel.

The present invention is applicable most suitably in a case where the spool has an undercut inside each of the flanges.

According to the present invention, the two mold members for molding the outer periphery of the shaft of the spool and the inner wall surfaces of the flanges are formed of a material having relatively low thermal conductivity, and the pair of mold members for molding the outer wall surfaces of the flanges are formed of a material having relatively high thermal conductivity at least at portions thereof that mold the outer wall surfaces of the flanges. Accordingly, the outer wall surfaces of the flanges of the molded spool are cooled at a relatively high rate, and contractile force acts thereon. Therefore, when the pair of mold members for molding the outer wall surfaces of the flanges are removed, the molded flanges warp axially outward of both ends of the shaft portion. Thus, the molded spool can be smoothly removed from the two mold members for molding the outer periphery of the shaft of the spool and the inner wall surfaces of the flanges without the flanges getting caught on the mold members. Accordingly, there will be no flaw in the inner wall surfaces of the flanges of the molded spool. In addition, there will be no variations in the dimension between the flange inner wall surfaces according to the position in the circumferential direction, which would otherwise be produced by the contact of the flanges with the two mold members for molding the outer periphery of the shaft of the spool and the inner wall surfaces of the flanges when the molded spool is removed from the mold members. Furthermore, it is possible to shorten the cooling time needed for the molded spool in the mold cavity and hence possible to shorten the molding cycle.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The injection mold for producing a spool according to the present invention will be described below by way of an embodiment.

Figure 1:
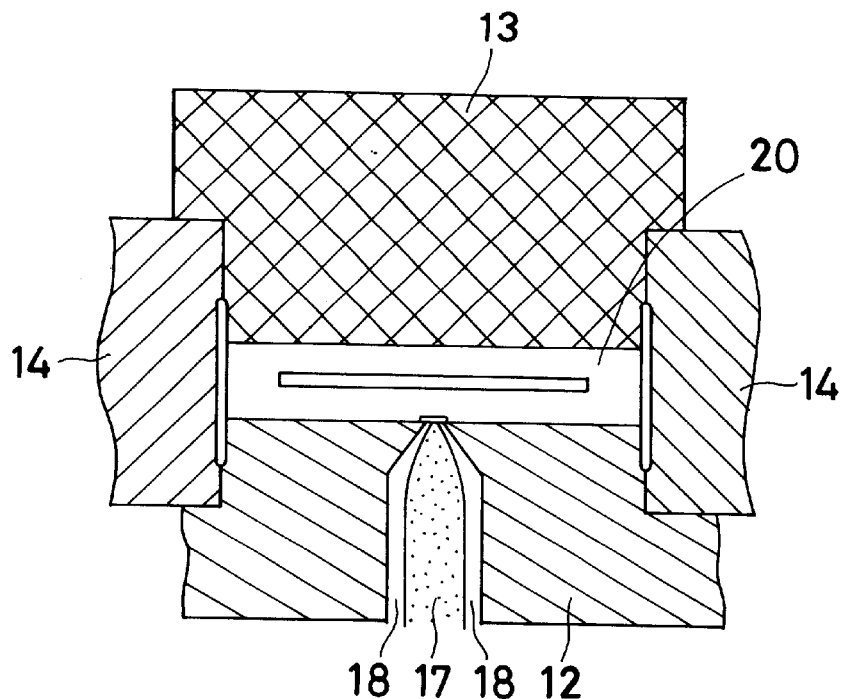
FIG. 1 is a sectional view of an injection mold according to one embodiment of the present invention for molding a spool for 120 format roll-film for photography.
Figure 6:
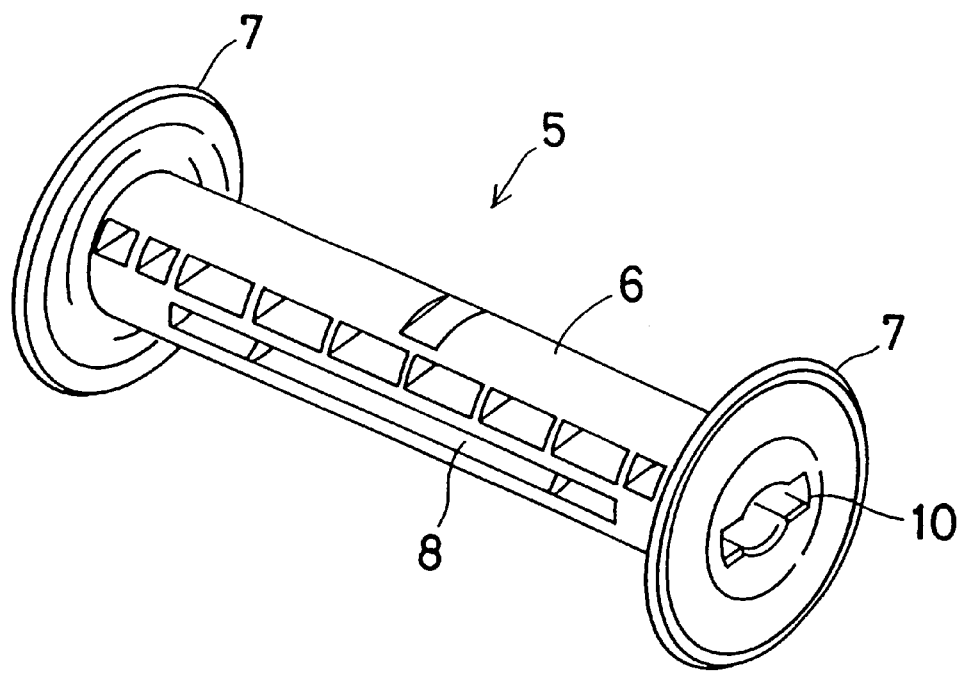
FIG. 6 is a perspective view of a spool for 120 format roll-film for photography.
Figure 7:
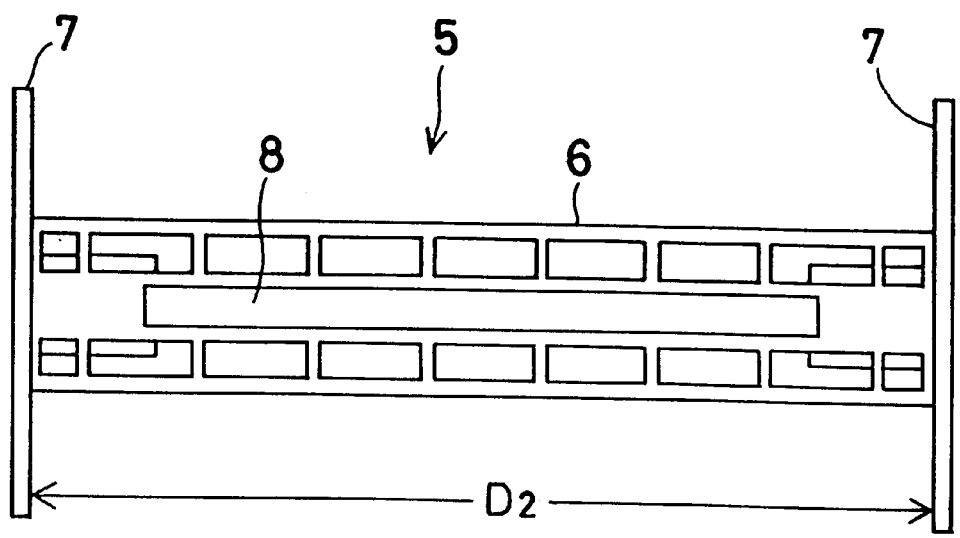
FIG. 7 is a sectional view of the spool for 120 format roll-film for photography.
Figure 8:
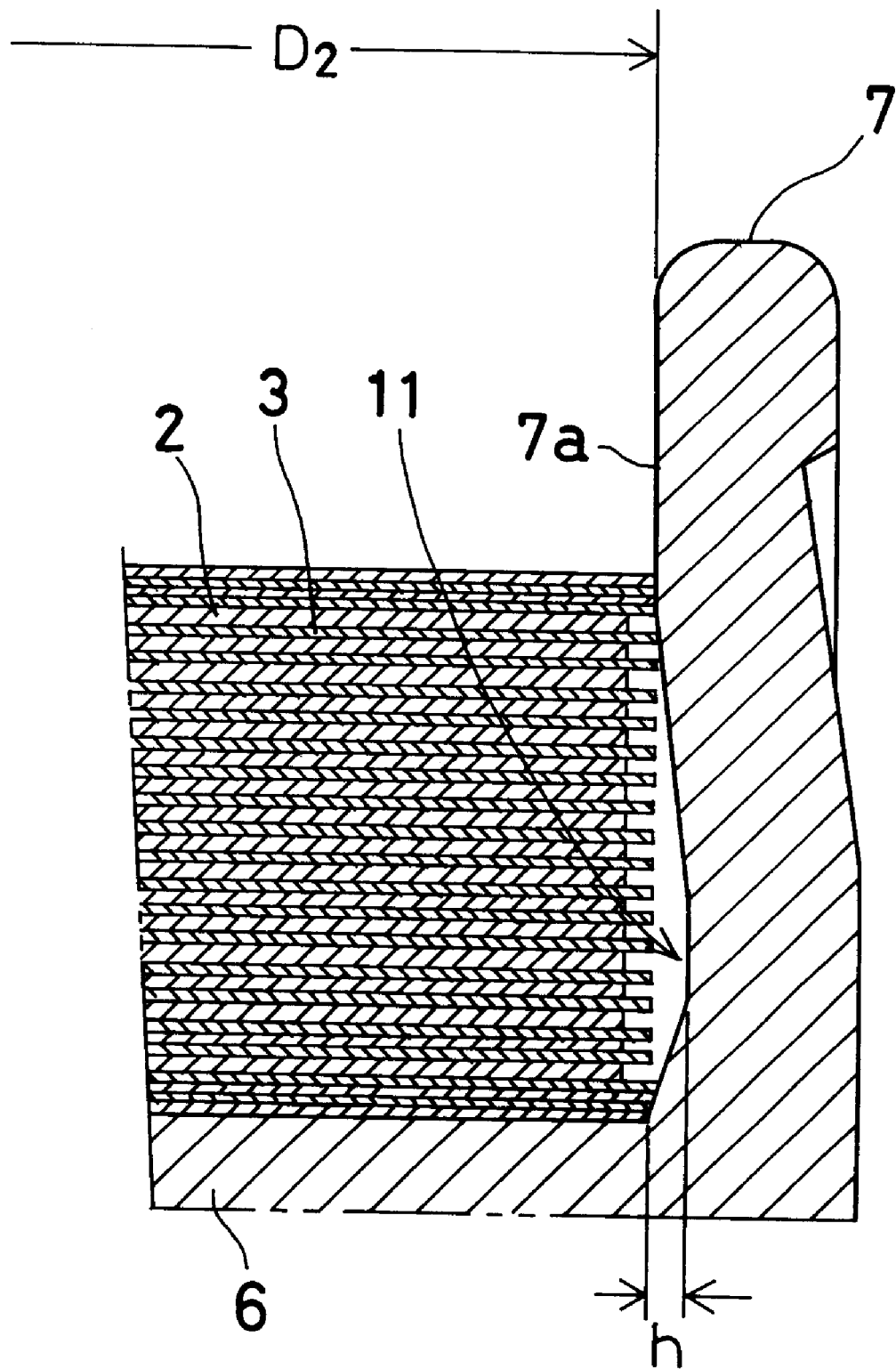
FIG. 8 is a diagram showing the details of a flange portion of 120 format roll-film for photography.
Figure 9:
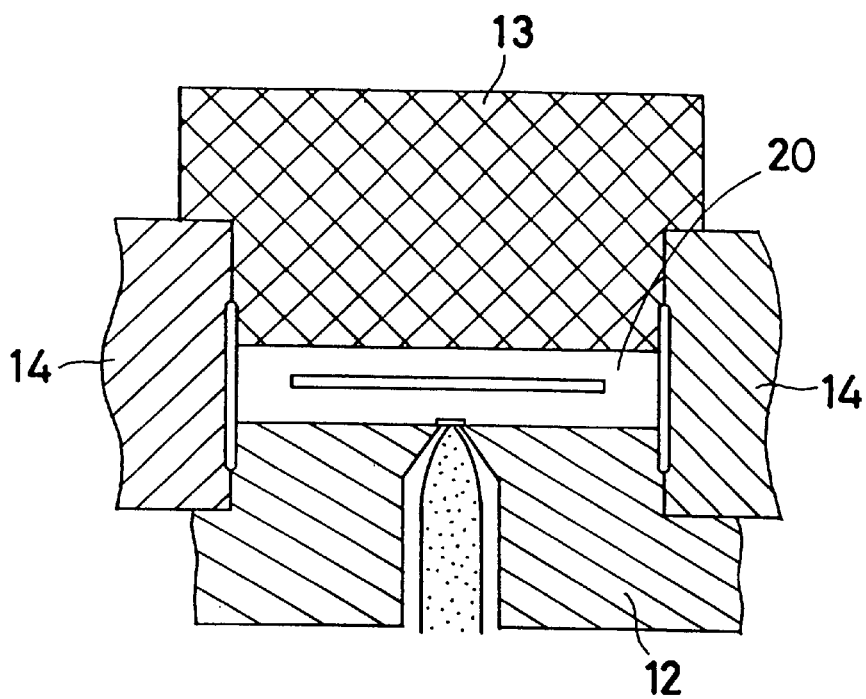
FIG. 9 is a sectional view of a conventional injection mold, which corresponds to FIG. 1.

FIG. 1 is a sectional view of an injection mold assembled to mold a spool 5 for 120 format roll-film for photography (see FIGS. 6 and 7). The mold is formed essentially by four mold members 12 to 14 surrounding a mold cavity 20 having the same configuration as that of the spool 5 as in the case of the conventional mold shown in FIG. 9. That is, the mold has a stationary mold member 12 for molding the lower half of the outer periphery of the shaft portion 6 of the spool 5 and the lower half of the inner wall surface 7a of each flange 7, and a movable mold member 13 for molding the upper half of the outer periphery of the shaft portion 6 and the upper half of the inner wall surface 7a of each flange 7. The mold further has a pair of slide mold members 14 for molding the outer wall surfaces of the flanges 7.

The stationary mold member 12 has a heater 17 provided in the center thereof. A runner 18 with a doughnut-shaped cross-sectional configuration and a gate are formed around the heater 17. The movable mold member 13 is movable vertically as viewed in FIG. 1 relative to the stationary mold member 12. The slide mold members 14 are movable horizontally as viewed in FIG. 1 relative to the stationary mold member 12. The movable mold member 13 is not provided with a runner, a heater, etc. A cooling water channel (not shown) is provided in the movable mold member 13 in the vicinity of the mold cavity 20.

Figure 2:
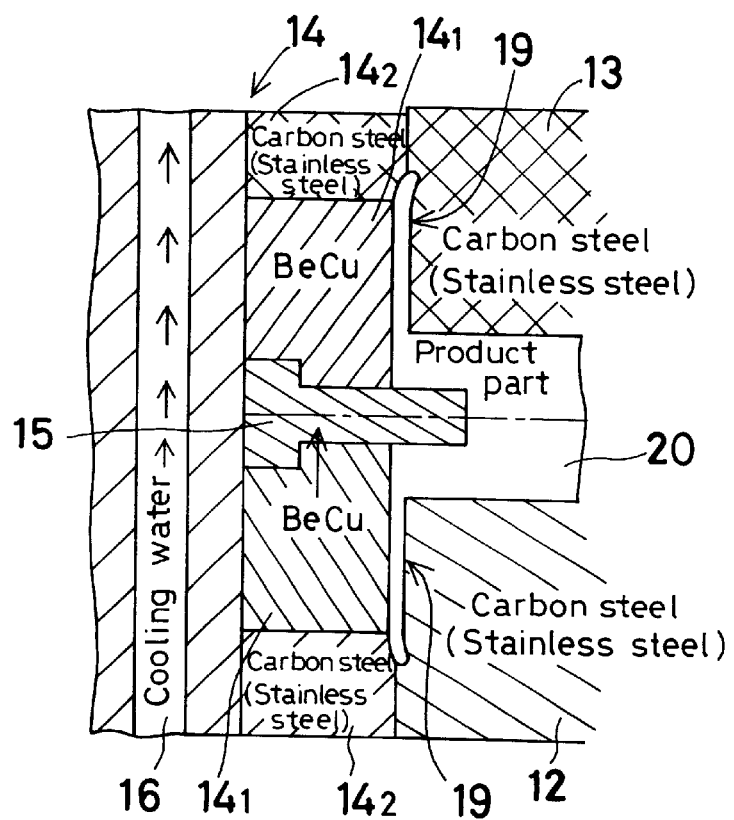
FIG. 2 is an enlarged view of a portion of the mold cavity of the mold in FIG. 1 that corresponds to a flange.

FIG. 2 is an enlarged view of a portion of the mold cavity 20 of the mold in FIG. 1 that corresponds to a flange 7. The pair of slide mold members 14 each include a portion $14_1$ that molds the outer wall surface of the flange 7, and a portion $14_2$ around the portion $14_1$. The portion $14_1$, which molds the outer wall surface of the flange 7, has a movable pin 15 rigidly provided in the center thereof to form a chucking groove 10 in each end of the shaft portion 6 of the spool 5. In addition, each slide mold member 14 is provided with a cooling water channel 16 for the purpose of shortening the cooling time needed to cool the slide mold member 14.

According to the present invention, the stationary mold member 12 and the movable mold member 13 are formed by using a martensitic stainless steel, which is a material having relatively low thermal conductivity, e.g. SUS403, SUS410, SUS410J1, SUS416, SUS420J1, SUS420J2, SUS420F, SUS431, SUS440A, SUS440B, SUS440C, or SUS440F. It is preferable to use one selected from among stainless pre-hardened steels and stainless hardened or tempered steels developed as mold steels, e.g. HPM38, HPM77, ACD51 and PSL (manufactured by Hitachi Metal Ltd.), STAVAX, RAMAXS and ELMAX (manufactured by Uddeholm K.K.), PD555, PD742 and NAK101(manufactured by Daido Special Steel Co., Ltd.), M300, M310ESR, M314 and M390M (manufactured by Polar Steel), and THYRO-PLAST2738, 2311, 2312 and 2083 (manufactured by Thyssen Nippon Co., Ltd.).

The portion $14_1$ of each slide mold member 14, which molds the outer wall surface of the flange 7, is formed by using a beryllium-copper alloy or the like, which is a material having relatively high thermal conductivity. More specifically, it is desirable to use a material whose thermal conductivity is not lower than the range of from 0.2 to 0.3 (cal/cm·s·° C.). Preferred examples are beryllium-copper alloys such as BEA-25, BEA-20C and BEA-275C (manufactured by Nippon Glass Co., Ltd.), an aluminum alloy such as HIT55 and copper alloys HIT72 and HIT75 (manufactured by Hitachi Metal Ltd.), and a copper alloy such as HR750 (manufactured by Kobe Steel Ltd.).

It should be noted that the portion $14_2$ around the portion $14_1$ of each slide mold member 14 may be formed of a material having relatively high thermal conductivity similar to that used to form the portion $14_1$. However, it is desirable to form the portion $14_2$ by using a material having relatively low thermal conductivity similar to that used to form the stationary mold member 12 and the movable mold member 13 as stated above.

Thus, according to the present invention, the two mold members 12 and 13 for molding the outer periphery of the shaft 6 of the spool 5 and the inner wall surfaces of the flanges 7 are formed of a material having relatively low thermal conductivity, and the pair of mold members 14 for molding the outer wall surfaces of the flanges 7 are formed of a material having relatively high thermal conductivity at least at the portions $14_1$, which mold the outer wall surfaces of the flanges 7. Therefore, the outer wall surfaces of the flanges 7 of the spool 5 molded in the mold cavity 20 are cooled at a relatively high rate, and contractile force acts thereon. Accordingly, when the slide mold members 14 are removed by moving them horizontally as viewed in FIG. 1 at a stage where a molten resin material injected into the mold cavity 20 through the runner 18 and the gate in the stationary mold member 12 has cooled down to a certain extent, the flanges 7 of the molded spool 5 warp axially outward of the two ends of the shaft portion 6. Therefore, even when there are projections at the roots of the end surfaces of the stationary and movable mold members 12 and 13 in correspondence to the concentric grooves 11 (undercuts 19) on the inner wall surfaces 7a of the flanges 7, the molded spool 5 can be smoothly removed from the stationary mold member 12 and the movable mold member 13 without the flanges 7 getting caught on the projections. Accordingly, there will be no flaw in the inner wall surfaces 7a of the flanges 7 of the molded spool 5. In addition, there will be no variations in the dimension between the inner wall surfaces 7a of the flanges 7 according to the position in the circumferential direction, which would otherwise be produced by the contact of the flanges 7 with the stationary and movable mold members 12 and 13 when the molded spool 5 is removed therefrom. Furthermore, it is possible to shorten the cooling time needed for the molded spool 5 in the mold cavity 20.

Figure 3A:
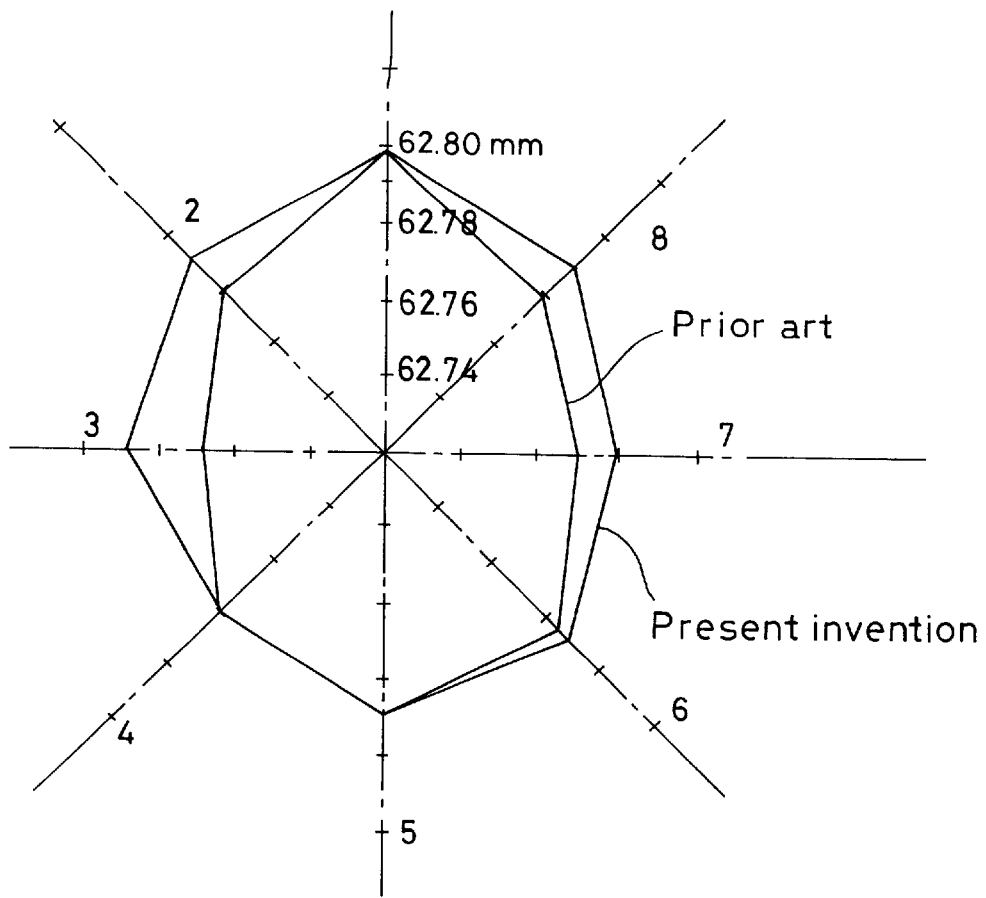
FIGS. 3(a)–3(c) are diagrams comparatively showing the circumferential distributions of inside dimension of a spool molded by using the mold according to the present invention and a spool of the same type molded by using a conventional mold.
Figure 3B:
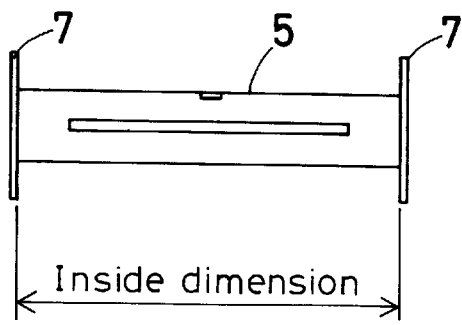
Figure 3C:
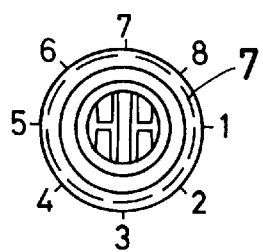
Figure 4:
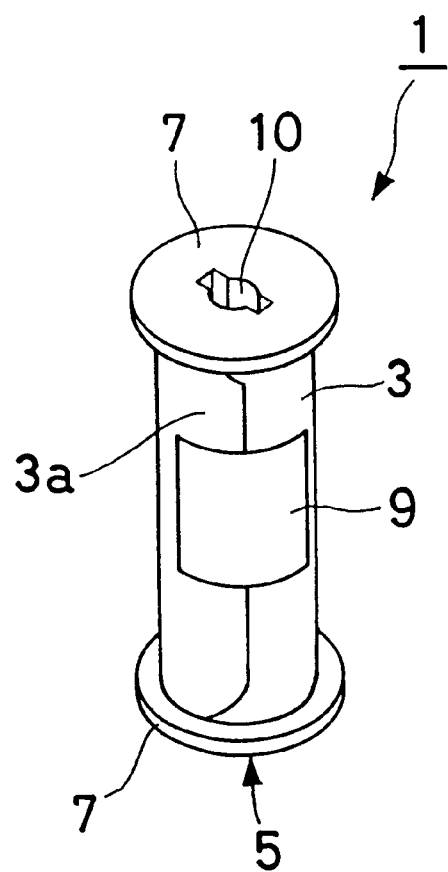
FIG. 4 is a diagram showing the external appearance of 120 format roll-film for photography.
Figure 5:
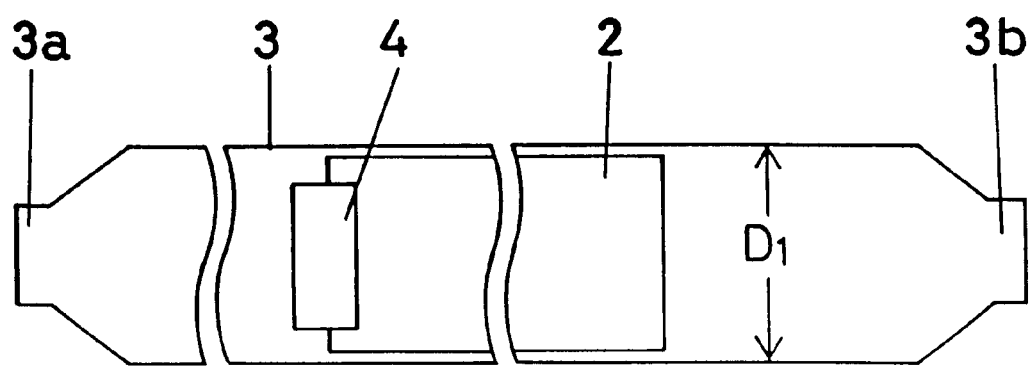
FIG. 5 is a diagram showing the structure of 120 format roll-film for photography.
Figure 10:
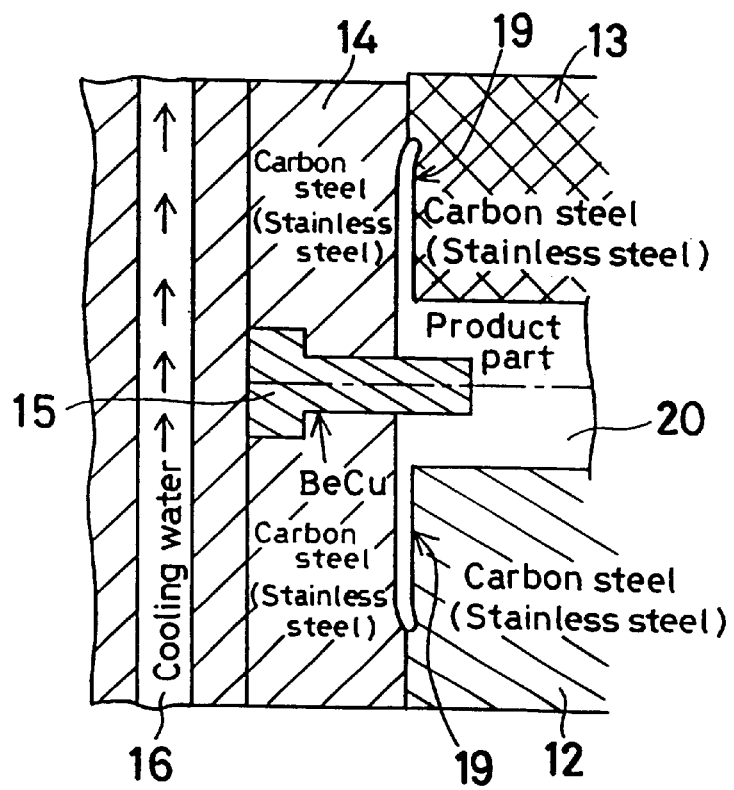
FIG. 10 is an enlarged view of a portion of the mold cavity of the mold in FIG. 9 that corresponds to a flange.

FIG. 3(a) shows comparatively the circumferential distributions of inside dimension of a spool for 120 format roll-film for photography molded by using the mold according to the present invention and a spool of the same type molded by using a conventional mold such as that shown in FIG. 10. As shown in FIG. 3(b), of FIG. 3, the inside dimension is the distance between the inner wall surfaces of the flanges 7 at the two ends of the spool 5. As shown in FIG. 3(c), the circumferential distribution is the distribution of inside dimension measured at 8 points spaced circumferentially at equal angles. The results of the measurement are shown by a circle graph in FIG. 3(a). As will be clear from the graph, the spool molded by the present invention shows a shape closer to an octagon than in the case of the prior art and thus suffers minimized variations in the inside dimension and minimized distortion.

Incidentally, it is desirable that the thermal conductivity of a material having relatively high thermal conductivity used to form the portions $14_1$ of the slide mold members 14, which mold the outer wall surfaces of the flanges 7, should be in the range of from two to four times as high as the thermal conductivity of a material having relatively low thermal conductivity used to form the stationary and movable mold members 12 and 13.

It should be noted that examples of resin materials used to injection-mold a spool for photographic film by employing a mold such as that of the present invention are high-impact polystyrenes (HIPS). However, polystyrene (PS), modified polyphenylene ether (PPE), polycarbonate resin (PC), polypropylene resin (PP), polybutylene terephthalate (PBT), polyethylene terephthalate (PET), polyamide (PA), etc. are also suitable for injection molding and usable in place of HIPS. Among these resin materials, HIPS, PPE and PC are particularly preferable from the viewpoint of mechanical strength and rigidity.

Although the injection mold for producing a spool according to the present invention has been described by way of embodiments, it should be noted that the present invention is not limited to these embodiments but can be modified in a variety of ways. In addition, the injection mold for producing a spool according to the present invention is effectively usable for injection-molding not only spools having undercuts inside flanges but also spools for 35 mm film in which flanges are provided at right angles to the shaft portion.

As will be clear from the foregoing description, in the injection mold for producing a spool according to the present invention, the two mold members for molding the outer periphery of the shaft of the spool and the inner wall surfaces of the flanges are formed of a material having relatively low thermal conductivity, and the pair of mold members for molding the outer wall surfaces of the flanges are formed of a material having relatively high thermal conductivity at least at portions thereof that mold the outer wall surfaces of the flanges. Accordingly, the outer wall surfaces of the flanges of the molded spool are cooled at a relatively high rate, and contractile force acts thereon. Therefore, when the pair of mold members for molding the outer wall surfaces of the flanges are removed, the molded flanges warp axially outward of both ends of the shaft portion. Thus, the molded spool can be smoothly removed from the two mold members for molding the outer periphery of the shaft of the spool and the inner wall surfaces of the flanges without the flanges getting caught on the mold members. Accordingly, there will be no flaw in the inner wall surfaces of the flanges of the molded spool. In addition, there will be no variations in the dimension between the flange inner wall surfaces according to the position in the circumferential direction, which would otherwise be produced by the contact of the flanges with the two mold members for molding the outer periphery of the shaft of the spool and the inner wall surfaces of the flanges when the molded spool is removed from the mold members. Furthermore, it is possible to shorten the cooling time needed for the molded spool in the mold cavity and hence possible to shorten the molding cycle.

What is claimed is:

1. An injection mold for molding a spool having flanges at both ends of a shaft, said flanges each having an inner wall surface with a groove therein, said groove being concentric with said shaft, said injection mold comprising:

two mold members for molding an outer periphery of the shaft of said spool, said inner wall surfaces of said flanges, and said grooves; and a pair of mold members for molding outer wall surfaces of said flanges;

wherein said two mold members for molding the outer periphery of the shaft of said spool, the inner wall surfaces of said flanges and the grooves are formed of a material having relatively low thermal conductivity, and said pair of mold members for molding the outer wall surfaces of said flanges are formed of a material having relatively high thermal conductivity at least at portions thereof that mold the outer wall surfaces of said flanges.

2. An injection mold according to claim 1, wherein the thermal conductivity of said material having relatively high thermal conductivity is in a range of from two to four times as high as the thermal conductivity of said material having relatively low thermal conductivity.

3. An injection mold according to claim 1, wherein said material having relatively high thermal conductivity consists essentially of a beryllium-copper alloy, and said material having relatively low thermal conductivity consists essentially of a stainless mold steel.

4. An injection mold according to claim 2, wherein said material having relatively high thermal conductivity consists essentially of a beryllium-copper alloy, and said material having relatively low thermal conductivity consists essentially of a stainless mold steel.

5. An injection mold according to claim 1, wherein the shaft of said spool fits a 120-size roll film or a 220-size roll film thereon.

6. An injection mold according to claim 2, wherein the shaft of said spool fits a 120-size roll film or a 220-size roll film thereon.

7. An injection mold according to claim 3, wherein the shaft of said spool fits a 120-size roll film or a 220-size roll film thereon.

* * * * *